(12) United States Patent
Barak et al.

(10) Patent No.: US 12,179,989 B2
(45) Date of Patent: Dec. 31, 2024

(54) USE OF A BAG HAVING AN INNER AND AN OUTER COMPARTMENT FOR FERTILIZERS

(71) Applicants: FERTILIZERS AND CHEMICALS LTD., Haifa (IL); PLASTO-SAC LTD., Sderot (IL)

(72) Inventors: Eran Barak, Pardes Hanna (IL); Yaron Beer, M.P. Hof Hacarmel (IL); Eyal Barnea, Nesher (IL); Michael Raisky, Haifa (IL); Yariv Sharmi, Petach Tikva (IL); Dan Shmueli, Rishon Le'zion (IL)

(73) Assignees: FERTILIZERS AND CHEMICALS LTD, Haifa (IL); PLASTO-SAC LTD, Sdrot (IL)

( * ) Notice: Subject to any disclaimer, the term of this patent is extended or adjusted under 35 U.S.C. 154(b) by 496 days.

(21) Appl. No.: 16/323,311

(22) PCT Filed: Aug. 7, 2017

(86) PCT No.: PCT/IB2017/054815
§ 371 (c)(1),
(2) Date: Feb. 5, 2019

(87) PCT Pub. No.: WO2018/029591
PCT Pub. Date: Feb. 15, 2018

(65) Prior Publication Data
US 2021/0300662 A1 Sep. 30, 2021

(30) Foreign Application Priority Data

Aug. 9, 2016 (IL) .......................................... 247240

(51) Int. Cl.
*B65D 81/32* (2006.01)
*B65D 30/22* (2006.01)
(Continued)

(52) U.S. Cl.
CPC ......... *B65D 81/3272* (2013.01); *B65D 31/12* (2013.01); *C05B 1/02* (2013.01);
(Continued)

(58) Field of Classification Search
CPC ................ B65D 31/12; B65D 81/3261; B65D 81/3266; B65D 75/5805; B65D 81/3272; C15C 1/00
(Continued)

(56) References Cited

U.S. PATENT DOCUMENTS 2,047,745 A 7/1936 Poppe
2,997,160 A * 8/1961 Marshall, Jr. .......... A01C 21/00
43/44.99

(Continued)

FOREIGN PATENT DOCUMENTS

CN 2721551 Y 8/2005
CN 202784142 U 3/2013
(Continued)

*Primary Examiner* — Chun Hoi Cheung
(74) *Attorney, Agent, or Firm* — David P. Owen; HOYNG ROKH MONEGIER B.V.

(57) ABSTRACT

Use of a packaging system for mutually incompatible agrochemicals, particularly for fertilizers, wherein said package (5) comprises: an external bag (12) and an inner bag (10) thereby forming two compartments; the inside of the inner bag being the inner compartment (10d) and the space between the inner side of the external bag and the outer side of the inner bag being the outer compartment (11d); wherein a first of the at least two mutually exclusive fertilizers is packaged in the inner compartment, and a second of the at least two mutually exclusive fertilizers is packaged in the outer compartment.

25 Claims, 4 Drawing Sheets

(51) Int. Cl.
    *C05B 1/02*     (2006.01)
    *C05B 1/04*     (2006.01)
    *C05C 1/00*     (2006.01)
    *C05C 5/02*     (2006.01)
    *C05C 5/04*     (2006.01)
    *C05D 1/00*     (2006.01)
    *C05G 1/00*     (2006.01)
    *C05G 5/16*     (2020.01)

(52) U.S. Cl.
    CPC ............... *C05B 1/04* (2013.01); *C05C 1/00* (2013.01); *C05C 5/02* (2013.01); *C05C 5/04* (2013.01); *C05D 1/00* (2013.01); *C05G 1/00* (2013.01); *C05G 5/16* (2020.02)

(58) Field of Classification Search
    USPC .................... 206/568, 219–222; 383/109
    See application file for complete search history.

(56) References Cited

U.S. PATENT DOCUMENTS

| | | | | |
|---|---|---|---|---|
| 3,479,802 A * | 11/1969 | Fesco | ............... | A47L 9/14 55/377 |
| 3,891,138 A * | 6/1975 | Glas | ............... | B65D 31/12 206/219 |
| 4,174,804 A * | 11/1979 | Bosse | ............... | B65D 31/02 493/224 |
| 4,235,332 A * | 11/1980 | Andersen | ............... | A61L 2/18 73/49.3 |
| 4,276,263 A * | 6/1981 | Andersen | ............... | A01N 59/00 206/524.1 |
| 4,297,402 A * | 10/1981 | Kinbara | ............... | B32B 27/10 428/34.3 |
| 4,462,224 A * | 7/1984 | Dunshee | ............... | A61F 7/106 62/530 |
| 4,550,442 A * | 10/1985 | Lepisto | ............... | B65D 31/04 383/120 |
| 4,782,874 A * | 11/1988 | Chartier | ............... | A45C 7/0077 150/112 |
| 4,991,980 A * | 2/1991 | Cohen | ............... | B65D 33/04 229/72 |
| 5,062,717 A * | 11/1991 | Shockley | ............... | A45C 3/00 383/125 |
| 5,881,883 A * | 3/1999 | Siegelman | ............... | B65D 81/03 206/720 |
| 5,938,034 A * | 8/1999 | Josephsen | ............... | B65D 81/3261 53/469 |
| 6,371,643 B2 * | 4/2002 | Saad | ............... | B65D 31/04 383/38 |
| 10,689,182 B1 * | 6/2020 | Thompson | ............... | B65D 81/3266 |
| 10,815,041 B2 * | 10/2020 | Binder | ............... | B65D 33/1691 |
| 2013/0209002 A1 * | 8/2013 | Bazbaz | ............... | B65D 75/5838 493/212 |
| 2015/0125096 A1 * | 5/2015 | Mulholland | ............... | B65D 31/02 383/38 |
| 2019/0152667 A1 * | 5/2019 | Binder | ............... | B65D 21/0227 |
| 2019/0344931 A1 * | 11/2019 | Kaila | ............... | B65D 77/30 |

FOREIGN PATENT DOCUMENTS

| | | |
|---|---|---|
| CN | 202912080 U | 5/2013 |
| CN | 202912145 U | 5/2013 |
| JP | 2012176770 A | 9/2012 |
| NL | 8602848 A | 6/1988 |
| NL | 8602857 A | 6/1988 |

\* cited by examiner

USE OF A BAG HAVING AN INNER AND AN OUTER COMPARTMENT FOR FERTILIZERS

FIELD OF THE INVENTION

The present invention relates to a packaging system for mutually incompatible agrochemicals, particularly for fertilizers.

BACKGROUND OF THE INVENTION

Use of fertilizers in the horticulture improves the crops on various types of soils. Many blended fertilizers may be produced from basic primary fertilizer products. Naturally not all such mixtures are compatible and suitable for long-term storage under a variety of conditions. Some such combinations may produce undesirable effects when mixed with others, including or chemical physical interactions, e.g. liquefaction, caking of the bulk, and chemical reactions. Hygroscopicity of the components may contribute to caking behavior. Moreover, some blends are known to be synergistically hygroscopic, requiring very low handling ambient relative humidity.

Generally, great care must be exercised to avoid these problems. These problems are addressed in a variety of ways. For example, WO/2010/088264 (to Everris International B.V.) suggests using mutually reactive acids and bases to overcome the problem of caking. Other suitable systems were disclosed in U.S. Pat. No. 5,222,595 (to Rhone-Poulenc Agrochemical Co), describing a soluble bag filled with one component, wherein a second soluble bag is placed. Additionally, Chinese utility model CN202379213U (to Ma Xu) describes a fertilizer bag containing an NPK fertilizer in a larger portion and a microbial fertilizer in a small pocket attached to the larger bag. Further, U.S. Pat. No. 7,392,898 (to Plant Products Co Ltd), describes a package for fertilizers, comprising two-compartment bag formed with three essentially coextensive sheets sealed along the periphery, two of them slightly larger than the third such that to allow to seal each compartment separately, first the larger compartment and then the smaller compartment and the larger compartment.

Generally, two-compartment packs are also known in U.S. Pat. No. 1,940,221 (to Miller Carlton Earle), disclosing cement bags with a compartment for additives to be used therewith. The bag is configured to allow separate filling of the compartments. Another publication, WO/2002/028724 (to Michael Clements Markham), discloses an improved packaging of an internal bag disposed within an external bag. The external bag comprises regions of weakness and is readily removable from the internal bag, thus improving the preservation of the internal packaging until final destination.

There is a need in the art to provide a fertilizer blend packaged in system suitable for mutually exclusive agrochemicals, such that the package would be stable and avoid degradation of the agrochemicals or caking of the bulk under high pressure and/or high temperature. There is further need in the art for such package as to allow discharging the contents thereof in a single step.

The present invention solves these problems as described hereinbelow.

SUMMARY OF THE INVENTION

One aspect of the present invention is a fertilizer product comprising mutually exclusive agrochemicals. The mutually exclusive agrochemicals may be fertilizers that are incompatible with one another. The fertilizer product is a packaging comprising a plurality of compartments, preferably two compartments, and the incompatible fertilizers are packaged in separate compartments of the same packaging. By appropriately choosing the packaging material the incompatibility reactions between the incompatible fertilizers may be minimized, or preferably, prevented.

Another aspect of the present invention is the packaging for storage and delivery of a fertilizer composition comprising incompatible fertilizers. The packaging may be in form of a first external plastic bag containing a second inner plastic bag thereby forming two compartments, the outer bag being the outer compartment and the inner bag being the inner compartment. The packaging may preferably comprise plastic (e.g. thus comprising plastic bags). Both bags share a common top opening, with the openings of the two bags being essentially coextensive and congruent. The external bag contains the inner bag with the opening of the inner bag essentially aligned along the opening of the external bag, at least a portion of the second bag opening being attached (e.g. fastened) to a portion of the first bag opening; and at least a portion of the second bag opening not being attached to a portion of the first bag opening such that a gap between the bags is formed. In some preferred embodiments both the top and the bottom of the first and the second bag are congruent and coextensive one to another.

The packaging is adapted to be accessible to a material filling unit for filling the first bag and the second bag simultaneously. The compartments may be independently accessible for loading from the top and are preferably sealable with a single top sealing step. When in use, the packaging may be cut open at the sealed top side, exposing the contents of all the inner bags and the outer bag concomitantly.

A further aspect of the present invention is the process of simultaneously filling a multi-compartmented packaging with mutually exclusive fertilizers. The filling step may be performed by a filling unit adapted to fill simultaneously the multi-compartment packaging to furnish fertilizer product. The filling unit may comprise separate nozzles distanced such that penetrates each of the nozzles into each packaging compartment. The mutually exclusive fertilizers are fed from a filling system to each of the nozzles of the filling unit and thereafter to each bag in a manner that prevents contact between the ingredients fed through each nozzle. The filling unit may further comprise grips, e.g. pneumatic grips, to secure the sides of the packaging during filling.

The filling of the packages described herein is such that the packages are filled with a filling unit comprising pneumatic grips and two separate nozzles distanced such that each of the nozzles penetrate into each bag compartment. According to one embodiment, one nozzle penetrates into the inner bag and the other nozzle penetrates into a portion of the outer bag (which is external to the inner bag) such that a portion of the inner bag on one side of the gap is placed between the nozzles, while the pneumatic grips attach to the outer surface of the package and mechanically open the access gaps. The products are fed from a filling system to each of said nozzles of the filling unit and thereafter to each bag in a manner that prevents contact between the ingredients fed through each nozzle.

The present invention relates to a package for storage and delivery of fertilizer compositions, comprising an external bag and an inner bag thereby forming two compartments, the inside of the inner bag being the inner compartment and the space between the inner side of the external bag and the outer side of the inner bag is the outer compartment; wherein the opening of the inner bag is essentially aligned, coextensive and congruent with the opening of the external bag; wherein at least a portion of the inner bag opening is attached to a portion of the external bag opening; and at least a portion of the inner bag opening not being attached to a portion of the external bag opening, such that a gap between said openings is formed; and wherein the bottom side of each of said inner bag and external bag is sealed.

Preferably, both the top and the bottom of the inner bag and the external bag are congruent and coextensive one to another.

Preferably, the bottom of the inner bag is attached to the bottom of the outer bag in at least two locations, or is integrally formed therewith.

Preferably, the inner bag is additionally attached to the outer bag along a portion of the height axis connecting the top side with the bottom side.

Preferably, the coextensive bags wherein the inner bag dimensions are package comprises two congruent and essentially similar to those of the external bag.

Preferably, the opening of the inner bag is attached to the opening of the external bag at two locations, wherein a first portion of the inner bag opening is attached to a first portion of the external bag opening at a first location of said locations and wherein a second portion of the inner bag opening is attached to a second portion of the external bag opening at a second location of said locations; wherein said first portion of the inner bag opening is at an opposite location to the second portion of said inner bag opening; and wherein said first portion of the external bag opening is at an opposite location to the second portion of said external bag opening.

Preferably, the opening of the package comprises three gaps; wherein the outermost two gaps are each between a portion of the external bag opening and the inner bag opening and the third gap is the inner bag opening.

Preferably, a first portion of the bottom of the inner bag is attached to a first portion of the bottom of the external bag at a first location of said locations and wherein a second portion of the bottom of the inner bag is attached to a second portion of the bottom of the external bag at a second location of said locations; wherein said first portion of the bottom of the inner bag is at an opposite location to the second portion of the bottom of the inner bag; and wherein said first portion of the bottom of the external bag is at an opposite location to the second portion of the bottom of the external bag.

Preferably, the inner bag comprises two inner pleats along its side edges; and wherein the external bag comprises two inner pleats along its side edges.

Preferably, the external bag has a larger thickness than that of the inner bag.

Preferably, said package is made of a plastic material comprising at least one polymer selected from the group consisting of low-density polyethylene (LDPE), medium-density polyethylene (MDPE), high-density polyethylene (HDPE), linear low-density polyethylene (LLDPE), a polypropylene (PP), and a metallocene polyethylene (mPE).

The present invention relates to a fertilizer product comprising at least two mutually exclusive fertilizers, packaged in the package as explained herein.

Preferably, a first of the at least two mutually exclusive fertilizers is packaged in the inner compartment, and a second of the at least two mutually exclusive fertilizers is packaged in the outer compartment.

Preferably, the fertilizer product comprises a pair of fertilizer selected from the group consisting of potassium chloride and urea; monoammonium phosphate and urea; a superphosphate and urea; an ammonium nitrate and urea; elemental sulfur and a nitrate; elemental sulfur and an ammonium compound; potassium pentahydrogen phosphate and a carbonate; acidulated rock phosphate magnesium nitrate and a carbonate; calcium nitrate and other generally inert fertilizers; and potassium pentahydrogen phosphate and other generally inert fertilizers.

Preferably, said superphosphate is selected from monocalcium phosphate as single, double and triple superphosphate.

Preferably, said ammonium nitrate is selected from the group consisting of ammonium nitrate, calcium ammonium nitrate, and ammonium sulfate nitrate.

Preferably, said nitrate is selected from the group consisting of ammonium nitrate, calcium nitrate, magnesium nitrate, potassium nitrate, and sodium nitrate.

Preferably, said carbonate is potassium carbonate.

Preferably, the fertilizer product has the composition of formula NPK 18-12-12 and 10.5 CaO, or NPK 19-16-16 and 5 Cao, or NPK 18-12-12 and 10 CaO, or NPK Dec. 6, 2024 and 10 Cao, or NPK Nov. 6, 2017 and 15 CaO.

The present invention further relates to a package for storage and delivery of fertilizer compositions, comprising an external bag and an internal bag thereby forming two compartments, the inside of the internal bag being the inner compartment and the space between the internal side of the external bag and the outer side of the internal bag being the outer compartment; wherein both the internal bag and the external bag are congruent and coextensive one to another;

wherein at least a portion of the internal bag opening is attached to a portion of the external bag opening, forming an attached portion of the package opening, and at least a portion of the internal bag opening not being attached to a portion of the external bag opening, such that a gap between said openings is formed, optionally the attached portion of the package opening being half of the circumference of the package opening; wherein the bottom side of said internal bag and said external bag is sealed by a common seal.

DETAILED DESCRIPTION OF THE INVENTION

Figure 1A:
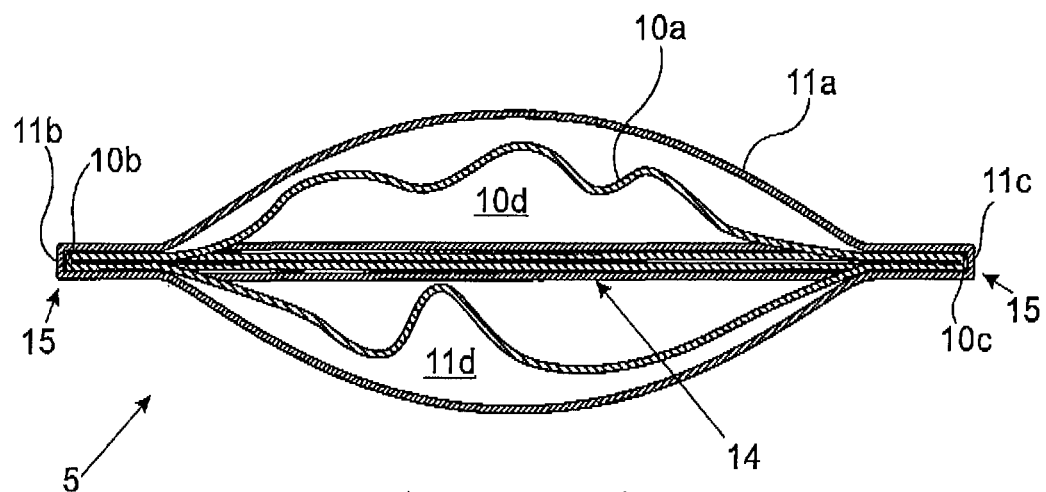
FIG. 1a demonstrates schematically a plan view of a package of an embodiment of the present invention.

In the preferred embodiment, a fertilizer product comprises mutually exclusive fertilizers. The fertilizers are packaged in a bag, e.g. plastic bag, adapted to contain the mutually exclusive fertilizers as follows. The package comprises two coextensive bags accommodated one within another, an external bag containing an internal bag. The bags preferably have an essentially orthogonal parallelepiped or rounded orthogonal parallelepiped geometry with first imaginary longitudinal axis, a second imaginary width axis, and a third imaginary depth axis. The bags have each a top portion and a bottom portion, opposite to the top portion along the longitudinal axis. The bags both have each two sides along the depth axis, a proximal side and an opposite distal side. The bags each have two edges, parallel to the longitudinal axis and along the width axis, connecting the proximal side with the opposing distal side, a left edge and a right edge, or, in case when the connection is provided via at least one pleat, two sets of such edges.

The bottom portion of the package is formed by sealing together the proximal side of the external bag, the proximal side of the internal bag, the distal side of the internal bag and the distal side of the external bag, along the width axis. The proximal sides of the internal and the external bags or the distal sides of the internal and the external bags are attached one to another optionally with a relatively weak bonding, e.g. an adhesive, along the longitudinal axis. The top portion of the package is therefore provided as opening of the internal and the external bags, with either the proximal side or the distal side of the package being adhered, providing two openings.

In case where the distal side of the package is adhered, the opening of the internal bag is defined by the proximal and the distal sides of the internal bags, and the opening of the external bag, defined by the proximal side of the external bag and the proximal side of the internal bag.

In case where the proximal side of the package is adhered, the opening of the internal bag is defined by the proximal and the distal sides of the internal bag, and the opening of the external bag, defined by the distal side of the external bag and the distal side of the internal bag.

The external bag and the internal bag are additionally permanently attached, e.g. sealed by a suitable seal, at or in proximity to the top portion at the left edge and at the right edge of the package, to prevent slipping of the internal bag inside the external bag.

Alternatively or additionally, the top portions of the proximal sides of the internal and the external bags or the top portions of the distal sides of the internal and the external bags are attached one to another (e.g. with an adhesive) along the width axis. Thus the middle portion of the internal bag on the longitudinal axis may be not attached to the external bag.

During the filling process, the both bags may be filled together, with the filling rate of each bag defining the quantity to be packaged. The package is sealed upon filling, providing an operationally symmetrical configuration, i.e. the opening by the end-user may be performed at either sealed top portion of the package or at sealed bottom portion of the package, to discharge the contents of both bags.

Definitions

The terms "fertilizer product" and the like, as used herein should be construed as a packaging containing incompatible fertilizers, unless the context dictates clearly otherwise.

The terms "mutually exclusive", "incompatible" and the like, as used interchangeably herein in reference to fertilizers should be construed as compounds interacting chemically or physically with other compounds, to cause at least one of the following: a chemical degradation or modification of at least one compound of the mix, a discoloration, a change in particles size of the mix, a change in particle size distribution of the mix, an aggregation or a caking of the mix, a liquefaction of the mix, an increase in hygroscopic properties of the mix, and/or increasing the safety risk in comparison to the sum of each of the incompatible components alone.

The term "congruent", as used herein in reference to various parts of the packaging, should be construed, unless the context dictates clearly otherwise, as two or more having an essentially similar geometric or shape having planar projection of an essentially similar geometric shape. The term "coextensive", as used similarly herein, should be construed, unless the context dictates clearly otherwise, as having an essentially similar dimension or having planar projection of an essentially similar dimension.

The packaging for storage and delivery of fertilizer composition comprising incompatible fertilizers may be in form of a bag. The bag may preferably be a plastic bag, comprising a first external plastic bag containing a second inner plastic bag thereby forming two compartments, the outer bag being the outer compartment and the inner bag being the inner compartment. The bottom side of each bag is sealed; therefore the bottom side of the packaging is the bottom side of the external larger bag. Both bags a common top opening, with the two openings of bags being essentially coextensive and congruent. The external bag contains the inner bag with the opening of the inner bag essentially aligned along the opening of the external bag, at least a portion of the second bag opening being attached (e.g. fastened) to a portion of the first bag opening; and at least a portion of the second bag opening not being attached to a portion of the first bag opening such that a gap between the bags is formed. In some preferred embodiments both the top and the bottom of the first and the second bag are congruent and coextensive one to another.

The attachment between the inner and outer bags may be carried out by welding, sticking, gluing, sewing, and the like.

According to one embodiment, the inner bag is additionally attached to the outer bag along a portion of the height axis connecting the top side with the bottom side, as to prevent the eversion or twisting of the inner bag on itself upon discharge of the packaging's contents.

According to one embodiment, the inner bag is attached to the outer bag at at least two locations. Preferably both locations are along a portion of the height axis connecting the top side with the bottom side. The top side opening of a double-compartment packaging therefore with is formed three independent opening-forming gaps, the outermost two gaps are each between a portion of the external bag and the inner bag, and the third gap is the central gap within the inner bag.

Additionally or alternatively, the inner bag is attached to the outer bag at the bottom side, and at at least one further location. The attachment at the bottom side may be effected by welding together the external bag and the inner bag during the manufacturing process as described in further detail herein.

The packaging may be adapted to be accessible to a material filling unit for filling the first bag and the second bag simultaneously, by the use of appropriate materials. The bags are independently accessible for loading from the top, and are sealable with a single top sealing step. Further bags may be placed within the second bag, forming additional compartments, simultaneously accessible for filling and sealable with a single sealing step.

When in use, the packaging is cut open at the sealed top side, exposing the contents of all the inner bags and the outer bag concomitantly. In some preferred embodiments, wherein both the top and the bottom of the first and the second bag are congruent and coextensive one to another, when in use the packaging may be cut open at the either side, top side or bottom side, exposing the contents of both the inner bag and the outer bag concomitantly.

Additionally or alternatively, the external and/or the internal bag may be provided with a plurality of pleats along the side of the bags, to accommodate larger volumes while minimizing the storage size of the empty bags.

The bags may be produced by a variety of techniques as known in the art for handling and forming of plastic sheets, such as cutting, welding, gluing, and the like, performed in a suitable order to furnish the bags.

According to a preferred embodiment (shown in FIGS. 1A-1B), the package 5 comprises two congruent and coextensive bags wherein the inner bag 10 dimensions are essentially similar to those of the external bag 11. The opening of the inner bag 10a is essentially aligned along the opening 11a of the external bag 11 and two opposite portions being side edges 10b and 10c of the inner bag opening 10a are attached (e.g. fastened) to two corresponding opposite portions (being side edges) 11b and 11c of the external bag opening 11a, e.g. by an appropriate seal. Preferably, the external bag 11 has a larger thickness than the inner bag 10. The thickness may vary, e.g. from about 40 micron to about 250 microns and preferably 60 to 120 microns. FIG. 1A is a top view of this embodiment wherein the bottom seam 14 can be shown.

Unless the context clearly dictates otherwise, the part numbers that refer to the parts of particular drawings, as used throughout herein, they also refer to the corresponding parts of other embodiments of the present invention.

The dimensions of the outer bag may vary according to the intended use, and may generally be between 50 and 100 cm in length, 30 and 60 cm in width, and the internal volume of the package may be between 5 and 50 liters and preferably between 20 and 30 liters, preferably about 25 liters. The dimensions of the internal bag may be similar to those of the outer bag. Most preferably, the dimensions of both inner and outer bags are essentially similar one to another, however, their thickness and/or material comprising them may vary. The impact resistance of the outer bag may be between 100 and 1500 grams, as measured by ASTM D1709 test procedure.

The packaging may be manufactured from a variety of materials, preferably polymeric materials or polymer blends. The suitable plastics include, but not limited to, low-density polyethylene (LDPE), medium-density polyethylene (MDPE), high-density polyethylene (HDPE), linear low-density polyethylene (LLDPE), a polypropylene (PP), and a metallocene polyethylene (mPE). Additional additives such as anti-block, anti-slip, as known in the art, may be added. Additionally, the packaging may be manufactured from a blend of two or more of polymers, or manufactured as a laminate of two or more layers each comprising different polymers. The innermost layer may be made from a heat sealing polymer. An additional layer may be used to impart particular properties, e.g. humidity barrier, oxygen barrier, or UV resistance. The plastics applicable to the layers include, but not limited to low-density polyethylene (LDPE), medium-density polyethylene (MDPE), high-density polyethylene (HDPE), linear low-density polyethylene (LLDPE), a polypropylene (PP), metallocene polyethylenes (mPE). Preferably, the outmost layer comprises materials selected from the group consisting of aluminum, a biaxially oriented polypropylene (BOPP), a paper, a biaxially oriented polyamide (BOPA), a cast polypropylene (CPP), a polyethylene (PE), a PP and Nylon.

The outmost layer of the external packaging may be adapted to impart enhanced friction properties, as to avoid sliding of a stack upon storage. The enhanced friction preferably comprises a coefficient of friction between 0.3 and 0.7. Thus, the external bag comprises material causing it to have more friction than that of the inner bag, making it more efficient during use. The plastics applicable to the improved friction layer include, but not limited to LDPE, MDPE, HDPE, LLDPE, PP, and mPE. Additionally, the outmost layer of the external package may be rendered with enhanced friction via mechanical methods, such as embossing or grating.

The suitable plastic films may be provided as rolls of sheets. The sheets may be manufactured as known in the art, by blown film extruded sleeves obtained, e.g. by extrusion of hot-melted polymers in an extruder. The suitable extruders include blown film extrusion. The sheets may be likewise co-extruded to form laminates. The extruded film tube may be split into sheets, e.g. by passing them through a slitting knife downstream from extrusion forming two sheets. Optionally, individual sheets may be laminated together, e.g. under pressure, adhesive, or heat lamination. Optionally, the inner bag and or outer bag may further comprise a woven material.

The packaging of the preferred embodiments may be manufactured by the method below. The method comprises steps of providing two rolls of (e.g. plastic) sheets. Each roll comprises a long rectangular sheet with a constant width that has been rolled around a central axis. Preferably the width of the first roll is essentially similar to that of the second roll. Both rolls are fed consecutively through a folding assembly to bring the edges of each roll adjacent one to another and essentially overlapping one consecutively forming another, thereby congruent sleeves that are essentially coextensive, one sleeve being within the other. The adjacent and/or overlapping portions of each of the sheets are bound together, e.g. by welding or with an adhesive, completing the sleeves. A glue may be placed between the welded sleeves to keep them together, along at least a portion of the longitudinal axis of the rolls. Series of welds are applied at predetermined positions, to bind both sleeves together in a single welding step. The welds are applied along the width of the sleeve in sleeve by a width/circumference portion being tightened and thereafter welded along all its width, thus causing a complete seal between both sides of the welds. A continuous roll of packages comprising two coextensive compartments is thus obtained. The individual packages may then be cut from the roll by cutting adjacent to the welds, and by providing seal, e.g. a K-seal (for square bottom) or a Tac-seal, contiguous to the opening of the packages, preferably near the cutting line, usually at a distance between about 1% to 5% of total package length, e.g. between 2 mm and 30 mm from the cutting line (from the opening). Optionally, the inner and outer bags at the side portions of the opening of the package may be attached one to another by an adhesive (e.g. glue). Thus a plurality of individual packages is readily manufactured, with the internal compartment coextensive with the external.

Figure 1B:
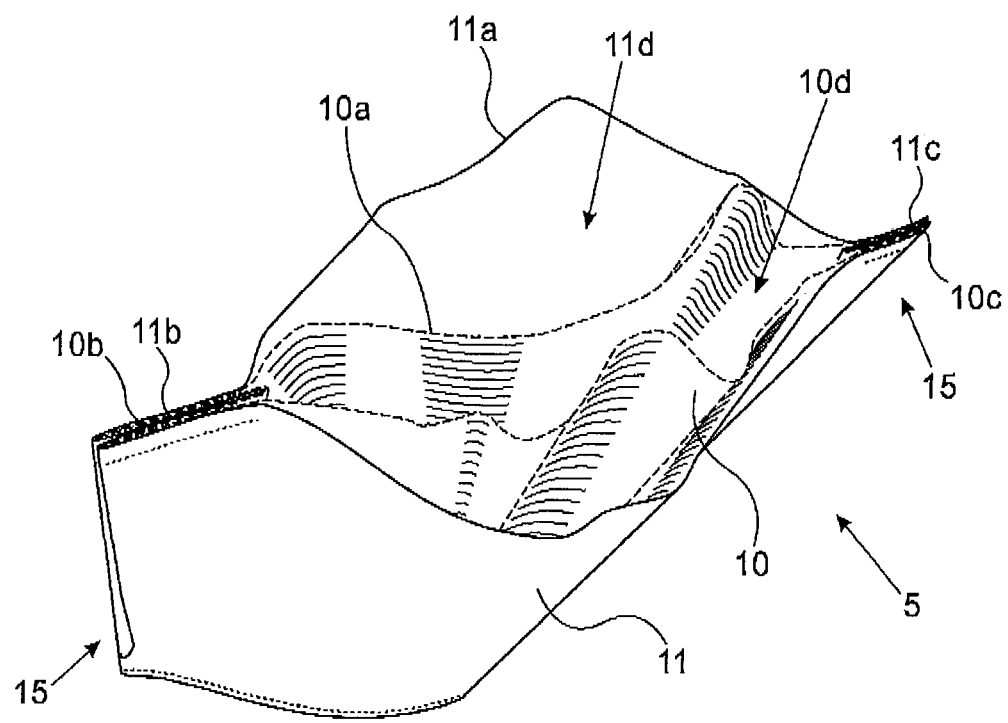
FIG. 1b demonstrates schematically an isometric projection view of a package of an embodiment of the present invention.

The package 5 is such that it comprises two compartments (shown in FIGS. 1A-1B). The inside of the inner bag 10 is the first compartment 10d. The space between the inner side of the external bag 11 and the outer side of the inner bag 10 is the second compartment 11d. The opening 10a of the inner bag leads to the first compartment 10d. Two gaps are formed at the opening. A first gap is between a portion of the opening 11a of the external bag 11 and a portion of the opening 10a of the inner bag 10. The second gap is between a corresponding portion of the opening 11a of the external bag 11 and a corresponding portion of the opening 10a of the inner bag.

Both gaps lead to the second compartment 11d. It should be noted that even though the bottom of the package 5 is sealed and the side edges of the top openings are sealed, the package 5 comprises an open space (being the second compartment 11d) between the inner and external bags in the middle of the package 5 length (below the opening and above the sealed bottom).

Preferably, before the step of applying the series of welds, a portion of the hollow (cylindrical) sleeve in sleeve shape is tightened forming a flat double rectangular shape. An inner fold is formed along the length of said portion at each side edge of the tightened flat double rectangular shape. The folds include a portion of both the inner sleeve and the outer sleeve being adjacent, coextensive and congruent to one another. Subsequently, the series of welds are applied by welding (similarly as explained hereinabove) but including the inner foldings (pleats). Thus a package 5 is formed with two inner foldings 15 along its side edges.

The configuration of the preferred embodiment is especially advantageous by providing versatility and flexibility as to the contents of the package 5. Additionally, the package provides for improved sealing of the sensitive materials, by allowing the material of the external compartment to apply pressure on the inner compartment free of material, thereby sealing it off with its weight.

Figures 2A, 2B:
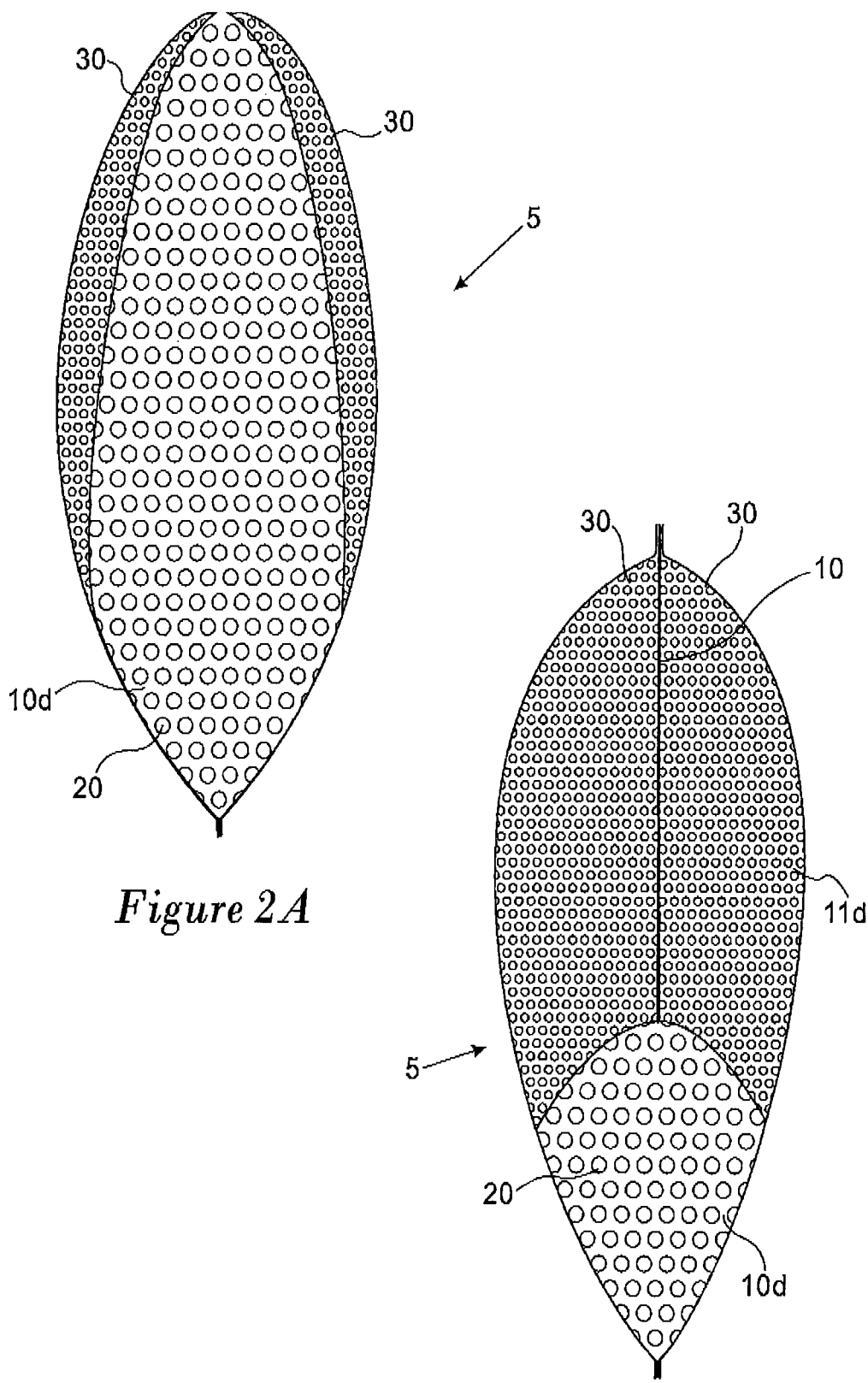
FIG. 2a demonstrates a side cross section view of a filled package of an embodiment of the present invention, with the inner compartment being filled with a smaller portion of the material and the outer compartment being filled with the larger portion of the material.
FIG. 2b demonstrates a side cross section view of a filled package of an embodiment of the present invention, with the inner compartment being filled with a larger portion of the material and the outer compartment being filled with the smaller portion of the material.

FIG. 2a demonstrates a side cross section view of a filled package 5 of an embodiment of the present invention, with the inner compartment 10d being filled with a first material 20 being filled less than a second material 30 filled in the second compartment 11d. FIG. 2b demonstrates a side cross section view of a filled package 5 of an embodiment of the present invention, with the inner compartment 10a being filled with a first material 20 being more than a second material 30 filled in the second compartment 11d. The figures refer to the packages obtained from the embodiment of FIG. 1B.

For example, when a first material 20 is inserted within the inner bag first compartment 10d, it descends towards the bottom of the inner bag 10. When the second compartment 11d is filled with a second quantity of a second material 30, the unused portion is closing the upper part of the inner bag 10 and providing additional sealing of the first material 20 (as shown in FIG. 2B). The relative amounts of both materials may be used in a ratio from 1:50 to 50:1, preferably between 1:25 and 25:1, between inner compartment 10d and outer compartment 11d, respectively, due to the coextensive dimensions of the two compartments. The package 5 may be cut open by the final user at either side to remove the contents of both bags, eliminating the need for special care on handling the package.

For example, if the whole package can contain 25 liters/kilograms of material, the distribution of the materials between the external and inner bags may be, e.g. 24.5:0.5, 24:1 liters/kilograms (respectively), 20:5, 13:12, etc. The present invention thus provides the need of versatile packaging applications, unlike prior art packages that are bounded to a constant maximal amount within a compartment.

Additionally, particularly wherein the smaller portion of the material is placed in the inner bag, the packaging may provide a further benefit of improved sealing. The material placed in the external bag may provide its weight on the remaining free portion of the inner bag (the portion that is unused by the filled material) and thereby assist in sealing the inner bag, particularly from the environmental untoward factors.

Furthermore, the methods of manufacture of this embodiment require relatively few and simple machinery steps enabling mass production; as opposed to several prior art packages that require complicated steps for forming their compartments.

According to a preferred embodiment of the present invention as shown in FIGS. 3A-3E, a package 105 is similar to package 5, wherein a portion of the opening 111a of the external bag 111 is attached to a corresponding portion of the opening 110a of the inner bag 110 forming an attached portion 117. The attached portion 117 is substantially half the circumference of the entire circumferences of the openings 110a and 111a respectively. The attached portion 117 is located at one side of the openings between side edges 110b and 110c and the opposite side edges 111b and 111c. Thus there are two openings formed, one for each compartment of the package.

Figure 3A:
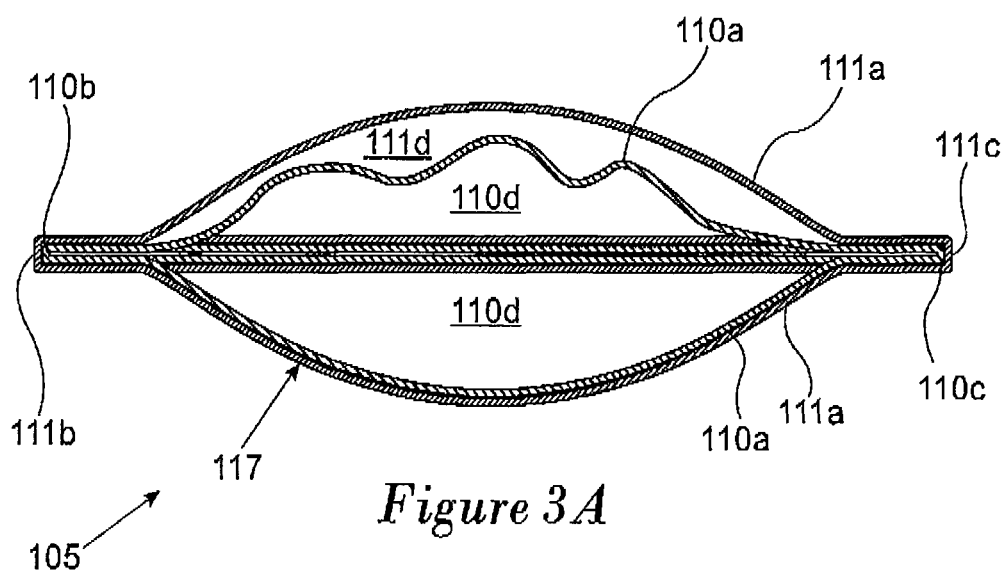
FIG. 3a demonstrates schematically a plan view of a package of a preferred embodiment of the present invention.
Figure 3B:
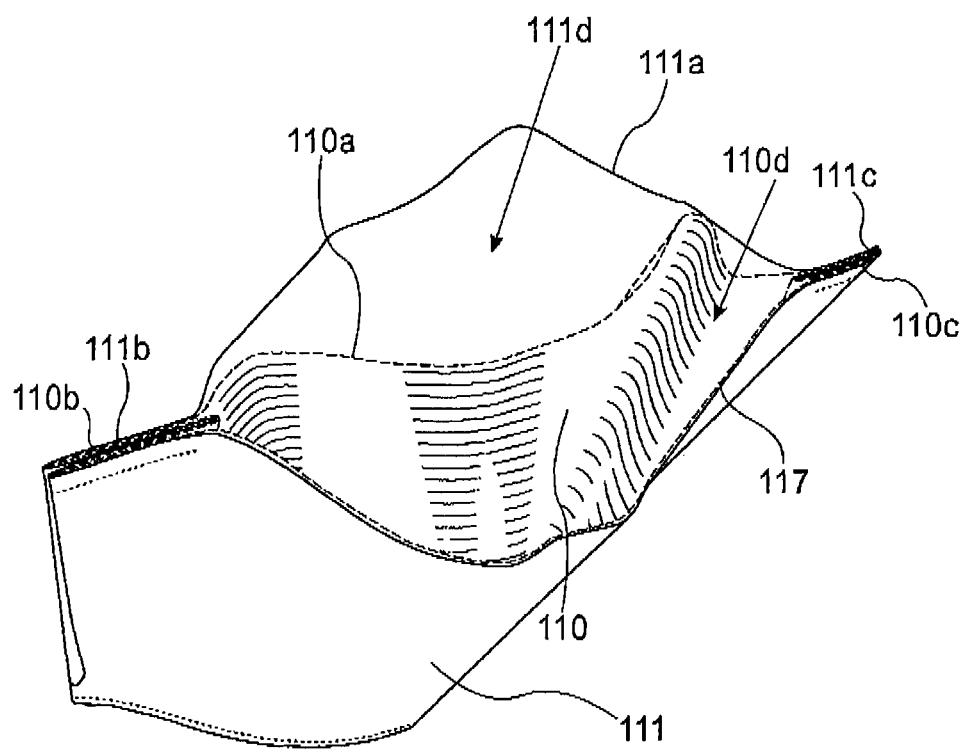
FIG. 3b demonstrates schematically an isometric projection view of a package of a preferred embodiment of the present invention.

The package 105 is such that it comprises two compartments (shown in FIGS. 3A-3B). The inside of the inner bag 110 is the first compartment 110d. The space between the inner side of the external bag 111 and the outer side of the inner bag 110 is the second compartment 111d. The first compartment 110d opening is bounded by the attached portion 117 and the not attached portion of opening 110a, leading to the interior of first compartment 110d. The second compartment 111d opening is bounded by the not attached portion of opening 110a and the not attached portion of opening 111a, leading to the interior of second compartment 111d.

Figure 3C:
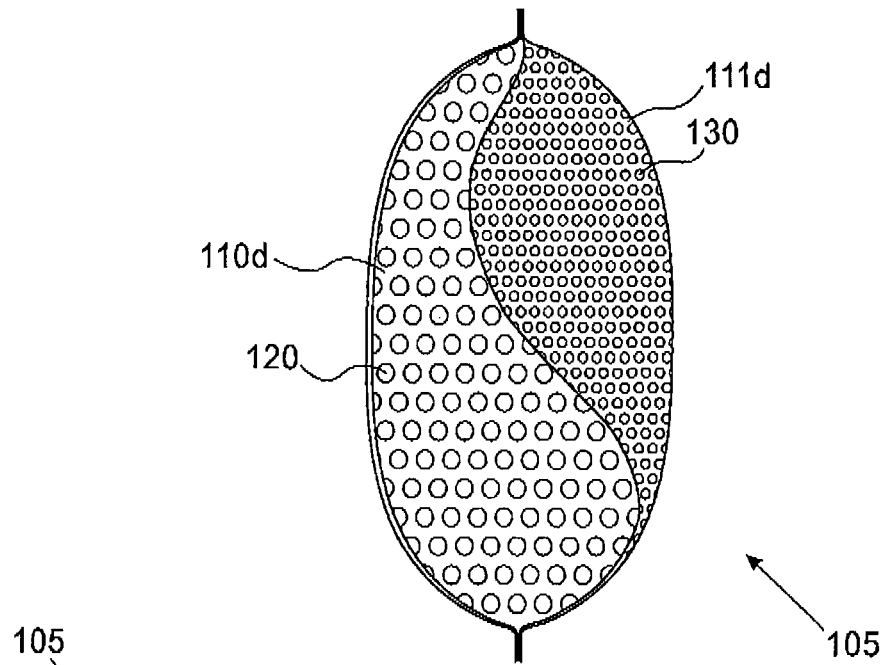
FIGS. 3c, 3d and 3e demonstrate schematically various filling patterns of the package of the preferred embodiment.

FIG. 3C demonstrates a side cross section view of a filled package 105 of an embodiment of the present invention, with the first compartment 110d being filled with material 120 being more than the material 130 filled in the second compartment 111d. The second compartment 111d is filled at a certain delay time after, or at a slower rate than the first compartment 110d.

Figure 3D:
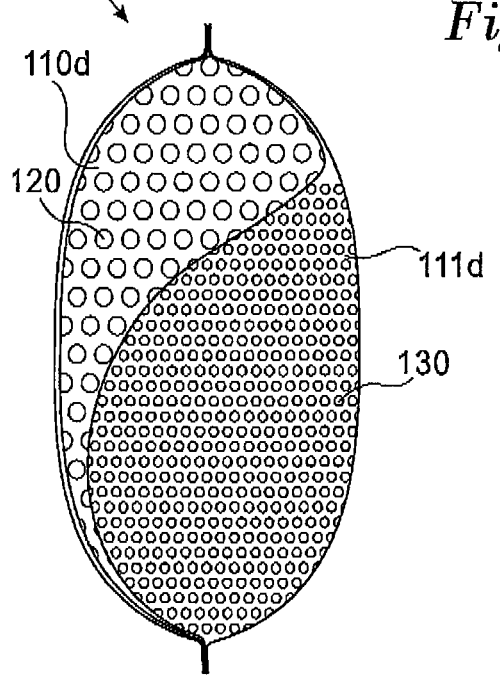

FIG. 3D demonstrates a side cross section view of a filled package 105 of an embodiment of the present invention, with the first compartment 110d being filled with material 120 being than the less material 130 filled in the second compartment 111d. The first compartment 110d is filled at a certain delay time after, or at a slower rate than the second compartment 111d.

Figure 3E:
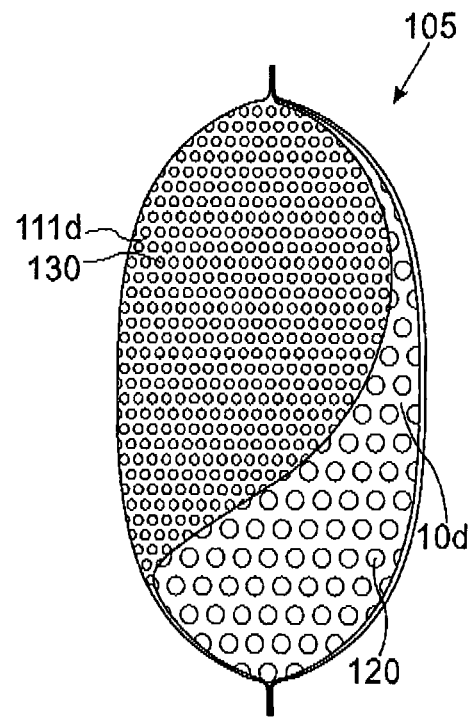

FIG. 3E demonstrates a side cross section view of a filled package 105 of an embodiment of the present invention, with the first compartment 110d being filled with material 120 being less than the material filled in 130 the second compartment 111d. The second compartment 111d is filled at a certain delay time after, or at a slower rate than the first compartment 110d. Thus the material 130 applies pressure contributing to an especially efficient sealing of the first compartment 110d.

The fertilizer product comprises at least two mutually exclusive fertilizers packed in the packaging described herein. A first of the incompatible fertilizers is packed into a first compartment of the packaging, and the second of the incompatible fertilizers is packaged in the second compartment. Generally, more than one fertilizer may be packaged in any of the compartments, provided that the fertilizers packaged in the same compartment are not incompatible; nevertheless, at least one of the fertilizers packaged in one compartment is incompatible with at least one fertilizer packaged in the other compartment.

The mutually exclusive fertilizers include, but not limited to the pairs of potassium chloride and urea; monoammonium phosphate and urea; a superphosphate and urea; ammonium nitrate and urea; elemental sulfur and nitrate or ammonium compounds; potassium pentahydrogen phosphate or acidulated rock phosphate and carbonate-containing fertilizers; magnesium nitrate, calcium nitrate, or potassium pentahydrogen phosphate, and other generally inert fertilizers.

Examples of phosphate fertilizers include monocalcium phosphate as single, double and triple superphosphate, and monoammonium phosphate. Examples of general ammonium-nitrate-based fertilizers include, but not limited to mixtures comprising ammonium nitrate, calcium ammonium nitrate, ammonium sulfate nitrate. Examples of general nitrate or ammonium compounds include, but not limited to mixtures comprising ammonium nitrate compounds, calcium nitrate, magnesium nitrate, and potassium or sodium nitrate. Examples of general carbonate-containing fertilizers compounds include, but not limited to mixtures comprising potassium carbonate.

Thus, in another aspect of the present invention there is provided a fertilizer product having the composition formula, e.g. of formula NPK 18-12-12 and 10.5 CaO, or NPK 19-16-16 and 5 CaO, or NPK 18-12-12 and 10 Cao, or NPK Dec. 6, 2024 and 10 Cao, or NPK Nov. 6, 2017 and 15 CaO.

The thickness and the composition of the inner package may be selected according to the degree of incompatibility between the products, according to the need.

In one embodiment, the present invention provides a package for storage and delivery of fertilizer compositions, comprising an external bag and an inner bag thereby forming two compartments, the inside of the inner bag being the inner compartment and the space between the inner side of the external bag and the outer side of the inner bag being the outer compartment;
 wherein the opening of the inner bag is essentially aligned, coextensive and congruent with the opening of the external bag;
 wherein at least a portion of the inner bag opening is attached to a portion of the external bag opening; and at least a portion of the inner bag opening not being attached to a portion of the external bag opening, such that a gap between said openings is formed; and
 wherein the bottom side of each of said inner bag and external bag is sealed.

In one embodiment, the present invention provides a package according to the preceding embodiment, wherein both the top and the bottom of the inner bag and the external bag are congruent and coextensive one to another.

In one embodiment, the present invention provides a package according to any the preceding embodiments, wherein the bottom of the inner bag is attached to the bottom of the outer bag in at least two locations, or is integrally formed therewith.

In one embodiment, the present invention provides a package according to any the preceding embodiments, wherein the inner bag is additionally attached to the outer bag along a portion of the height axis connecting the top side with the bottom side.

In one embodiment, the present invention provides a package according to any the preceding embodiments, wherein the package comprises two congruent and coextensive bags wherein the inner bag dimensions are essentially similar to those of the external bag.

In one embodiment, the present invention provides a package according to any the preceding embodiments, wherein the opening of the inner bag is attached to the opening of the external bag at two locations, wherein a first portion of the inner bag opening is attached to a first portion of the external bag opening at a first location of said locations and
 wherein a second portion of the inner bag opening is attached to a second portion of the external bag opening at a second location of said locations;
 wherein said first portion of the inner bag opening is at an opposite location to the second portion of said inner bag opening; and
 wherein said first portion of the external bag opening is at an opposite location to the second portion of said external bag opening.

In one embodiment, the present invention provides a package according to any the preceding embodiments, wherein the opening of the package comprises three gaps;
 wherein the outermost two gaps are each between a portion of the external bag opening and the inner bag opening and the third gap is the inner bag opening.

In one embodiment, the present invention provides a package according to any the preceding embodiments, wherein a first portion of the bottom of the inner bag is attached to a first portion of the bottom of the external bag at a first location of said locations and wherein a second portion of the bottom of the inner bag is attached to a second portion of the bottom of the external bag at a second location of said locations;
 wherein said first portion of the bottom of the inner bag is at an opposite location to the second portion of the bottom of the inner bag; and
 wherein said first portion of the bottom of the external bag is at an opposite location to the second portion of the bottom of the external bag.

In one embodiment, the present invention provides a package according to any the preceding embodiments, wherein the inner bag comprises two inner pleats along its side edges; and wherein the external bag comprises two inner pleats along its side edges.

In one embodiment, the present invention provides a package according to any the preceding embodiments, wherein the external bag has a larger thickness than that of the inner bag.

In one embodiment, the present invention provides a package according to any the preceding embodiments, wherein said package is made of a plastic material comprising at least one polymer selected from the group consisting of low-density polyethylene (LDPE), medium-density polyethylene (MDPE), high-density polyethylene (HDPE), linear low-density polyethylene (LLDPE), a polypropylene (PP), and a metallocene polyethylene (mPE).

In one embodiment, the present invention provides A fertilizer product comprising at least two mutually exclusive fertilizers, packaged in the package according to any one of the preceding embodiments.

In one embodiment, the present invention provides a fertilizer product according to the preceding embodiment, wherein a first of the at least two mutually exclusive fertilizers is packaged in the inner compartment, and a second of the at least two mutually exclusive fertilizers is packaged in the outer compartment.

In one embodiment, the present invention provides a fertilizer product according to any one of the preceding embodiments, comprising a pair of fertilizer selected from the group consisting of potassium chloride and urea; monoammonium phosphate and urea; a superphosphate and urea; an ammonium nitrate and urea; elemental sulfur and a nitrate; elemental compound; potassium pentahydrogen sulfur and an ammonium phosphate and a carbonate; acidulated rock phosphate magnesium nitrate and a carbonate; calcium nitrate and other generally inert fertilizers; and potassium pentahydrogen phosphate and other generally inert fertilizers.

In one embodiment, the present invention provides a fertilizer product according to any one of the preceding embodiments, wherein said superphosphate is selected from monocalcium phosphate as single, double and triple superphosphate.

In one embodiment, the present invention provides a fertilizer product according to any one of the preceding embodiments, wherein said ammonium nitrate is selected from the group consisting of ammonium nitrate, calcium ammonium nitrate, and ammonium sulfate nitrate.

In one embodiment, the present invention provides a fertilizer product according to any one of the preceding embodiments, wherein said nitrate is selected from the group consisting of ammonium nitrate, calcium nitrate, magnesium nitrate, potassium nitrate, and sodium nitrate.

In one embodiment, the present invention provides a fertilizer product according to any one of the preceding embodiments, wherein said carbonate is potassium carbonate.

In one embodiment, the present invention provides a fertilizer product according to any one of the preceding embodiments, having the composition of formula NPK 18-12-12 and 10.5 CaO, or NPK 19-16-16 and 5 Cao, or NPK 18-12-12 and 10 Cao, or NPK Dec. 6, 2024 and 10 Cao, or NPK Nov. 6, 2017 and 15 CaO.

In one embodiment, the present invention provides a package for storage and delivery of fertilizer compositions, comprising an external bag and an internal bag thereby forming two compartments, the inside of the internal bag being the inner compartment and the space between the internal side of the external bag and the outer side of the internal bag being the outer compartment;
  wherein both the internal bag and the external bag are congruent and coextensive one to another;
  wherein at least a portion of the internal bag opening is attached to a portion of the external bag opening, forming an attached portion of the package opening, and at least a portion of the internal bag opening not being attached to a portion of the external bag opening, such that a gap between said openings is formed, optionally the attached portion of the package opening being half of the circumference of the package opening;
  wherein the bottom side of said internal bag and said external bag is sealed by a common seal.

The invention is better understood by reference to the examples below, which however do not limit the invention in any respect. Many variants and equivalents may be readily envisaged by the skilled artisan; the invention therefore encompasses all of these variations and equivalents.

EXAMPLES

Example 1—Comparative

A combination of 15 kg of NPK 20-20-20 (NovAcidNPK™ 20-20-20, manufactured by ICL Fertilizers and Chemicals, Haifa, Israel), and 10 kg of calcium nitrate was packaged in a 120-micron thick polyethylene bag, having the dimensions of 80 cm in length, 35.5 cm in width, 4.8 cm longitudinal pleat. Total 6 bags were prepared. The composition of formula NPK 18-12-12 and 10.5 CaO was thus obtained. The bag was placed in a commercial warehouse under pressure of 3 tons (two stacked pallets of ca 1.5 tons each, containing 10 layers of six 25-kg packs).

Bags were checked for caking using visual inspection, at time points 2 weeks and then monthly over 4 months. Caking developed, confirmed at monthly time points.

Example 2—Comparative

A combination of 20 kg of NPK 20-20-20 as in the Example 1 and 5 kg of calcium nitrate was packaged as in the Example 1. The composition of formula NPK 19-16-16 and Cao was thus obtained. Total 6 bags were prepared. The bags were placed in a commercial warehouse under pressure of 3 tons, as in the Example 1.

Bags were checked for caking using visual inspection, at time points 2 weeks and then monthly over 4 months. Caking developed, confirmed at monthly time points.

Example 3

The composition as in the example 1 was packaged into a double-compartment bag with the external compartment, having the dimensions of 80 cm in length, 35.5 cm in, containing NPK 20-20-20 as in the Example 1, and the internal compartment, having similar dimensions, attached at the top with two tack seals, and with a glue along the length axis, containing calcium nitrate. Both compartments of the bags were filled simultaneously using a double funnel, and sealed in a single sealing step. Total 6 bags were prepared. The bags were placed in a commercial warehouse under pressure of 3 tons, as in the Example 1.

Bags were checked for caking using visual inspection, at time points 2 weeks and then monthly over 4 months. No caking was detected, confirmed at monthly time points.

Example 4

The composition as in the example 2 was packaged in the bags as in the example 3, and tested under identical conditions. No caking was detected.

Example 5—Comparative

A combination of 400 g of NPK 18-18-18, (NovAcidNPK™ 18-18-18, manufactured by ICL Fertilizers and Chemicals, Haifa, Israel), and 100 g of calcium nitrate, was packaged in a 120-micron thick polyethylene bag, having the dimensions of 16 cm in length, 35.5 cm in width. The bags were perforated to improve filling. The composition of formula NPK 18-14-14 and 5 CaO was thus obtained.

The bags were placed in a controlled environment incubator and stored at 50° C. and 95% relative humidity for 72, 140 and 240 hours. The bags were weighed at the time points, and visually inspected at 240 hours. The weight difference was +0.36%, +0.45%, and −2.0%, respectively, and the visual inspection revealed liquefied and caked composition.

Example 6—Comparative

A combination of 300 g of NPK 18-18-18, as in the Example 5, and 200 g of calcium nitrate, was packaged in the bags and stored, as in the Example 5. The composition of formula NPK 17-11-11 and 10.5 CaO was thus obtained. The weight difference at 72, 140 and 240 hours was +0.51%, −4.0%, and −4.5%, respectively. Visual inspection revealed discolored, liquefied and caked composition.

Example 7

A composition of NPK 18-18-18 and calcium nitrate was packaged in two-compartment bag with coextensive inner and outer compartments, with dimensions similar to the bags of the Example 5. The outer bag was perforated to facilitate filling. Calcium nitrate (100 g) was packed in the inner compartment, and NPK 18-18-18 (400 g) was packed in the outer compartment. The composition of formula NPK 18-14-14 and 5 CaO was thus obtained.

The bags were placed in a controlled environment incubator and stored at 50° C. and 95% relative humidity for 72, 140 and 240 hours. The bags were weighed at the time points, and visually inspected at 240 hours. The weight difference was +0.43%, +0.64%, and +0.80%, respectively, and the visual inspection revealed powdered composition, with calcium nitrate unchanged, and NPK 18-18-18 (exposed to the perforations) slightly lumpy and wet, yet processable.

Example 8

A composition of NPK 18-18-18 (300 g) and calcium nitrate (200 g) was packaged in two-compartment bag as in the Example 7. The composition of formula NPK 17-11-11 and 10.5 CaO was thus obtained. The bags were placed in a controlled environment incubator and stored at 50° C. and 95% relative humidity for 72, 140 and 240 hours. The bags were weighed at the time points, and visually inspected at 240 hours. The weight difference was +1.24%, +1.24%, and +1.60%, respectively, and the visual inspection revealed powdered composition, with calcium nitrate unchanged, and NPK 18-18-18 (exposed to the perforations) slightly lumpy and wet, yet processable.

The invention claimed is:

1. A package for storage and delivery of fertilizer compositions, wherein said package comprises:
   an external bag containing an internal bag, the bags arranged to form two compartments for the fertilizer compositions, an inner compartment and an outer compartment;
   an inside of the internal bag being the inner compartment and a space between an inner side of the external bag and an outer side of the internal bag being the outer compartment;
   wherein the external and internal bags each have a top portion and a bottom portion opposite to the top portion along a longitudinal axis, the bags each have a proximal side and distal side, and the bags each have two edges parallel to the longitudinal axis and connecting the proximal side with the opposing distal side of the respective bag;
   wherein the top portion of each of the bags being provided with an opening, the opening of the internal bag being essentially aligned, coextensive and congruent with the opening of the external bag;
   wherein at least a portion of the internal bag opening is attached to a portion of the external bag opening at two locations, and at least a portion of the internal bag opening not being attached to a portion of the external bag opening, thereby forming three gaps, the outermost two gaps each between a portion of the external bag opening and the internal bag opening and the third gap formed by the internal bag opening, wherein the outermost two gaps both lead to the same outer compartment and the third gap leads to the inner compartment; and
   wherein the bottom side of each of said internal bag and external bag is sealed;
   wherein the package comprises at least two mutually exclusive fertilizers;
   wherein a first of the at least two mutually exclusive fertilizers is packaged in the inner compartment, and a second of the at least two mutually exclusive fertilizers is packaged in the outer compartment; and
   wherein the internal bag is attached to the external bag only at a top portion of a left edge of the package and at a top portion of a right edge of the package and at a bottom of the package where the bottom of the internal bag is attached to a bottom of the external bag in at least two locations.

2. The package of claim 1, wherein both the top and the bottom of the internal bag and the external bag are congruent and coextensive one to another.

3. The package according to claim 1, wherein the bottom of the internal bag is attached to the bottom of the outer bag in at least two locations or is integrally formed therewith.

4. The package according to claim 1, wherein the internal bag is additionally attached to the outer bag along a portion of the height axis connecting the top side with the bottom side.

5. The package according to claim 1, wherein the package comprises two congruent and coextensive bags wherein the internal bag dimensions are essentially similar to those of the external bag.

6. The package according to claim 1, wherein the opening of the internal bag is attached to the opening of the external bag at two locations,
   wherein a first portion of the internal bag opening is attached to a first portion of the external bag opening at a first location of said locations and wherein a second portion of the internal bag opening is attached to a second portion of the external bag opening at a second location of said locations;
   wherein said first portion of the internal bag opening is at an opposite location to the second portion of said internal bag opening; and
   wherein said first portion of the external bag opening is at an opposite location to the second portion of said external bag opening.

7. The package according to claim 1, wherein a first portion of the bottom of the internal bag is attached to a first portion of the bottom of the external bag at a first location of said locations and wherein a second portion of the bottom of the internal bag is attached to a second portion of the bottom of the external bag at a second location of said locations;
   wherein said first portion of the bottom of the internal bag is at an opposite location to the second portion of the bottom of the internal bag; and
   wherein said first portion of the bottom of the external bag is at an opposite location to the second portion of the bottom of the external bag.

8. The package according to claim 1, wherein the internal bag comprises two inner pleats along its side edges; and wherein the external bag comprises two inner pleats along its side edges.

9. The package according to claim 8, wherein the pleats along the side edges of the internal bag are attached to the pleats along the side edges of the external bag.

10. The package according to claim 1, wherein the external bag has a larger thickness than that of the internal bag.

11. The package according to claim 1, wherein said package is made of a plastic material comprising at least one polymer selected from the group consisting of low-density polyethylene (LDPE), medium-density polyethylene (MDPE), high-density polyethylene (HDPE), linear low-density polyethylene (LLDPE), a polypropylene (PP), and a metallocene polyethylene (mPE).

12. A package for storage and delivery of fertilizer compositions, wherein said package comprises:
an external bag containing an internal bag, the bags arranged to form two compartments for the fertilizer compositions, an inner compartment and an outer compartment;
an inside of the internal bag being the inner compartment and a space between an inner side of the external bag and an outer side of the internal bag being the outer compartment;
wherein the external and internal bags each have a top portion and a bottom portion opposite to the top portion along a longitudinal axis, the bags each have a proximal side and distal side, and the bags each have two edges parallel to the longitudinal axis and connecting the proximal side with the opposing distal side of the respective bag;
wherein the top portion of each of the bags being provided with an opening, the opening of the internal bag being essentially aligned, coextensive and congruent with the opening of the external bag;
wherein at least a portion of the internal bag opening is attached to a portion of the external bag opening by attaching the top portion of the proximal side of the internal bag and the top portion of the proximal side of the external bag over half a circumference of the openings;
wherein the bottom side of each of said internal bag and external bag is sealed;
wherein the package comprises at least two mutually exclusive fertilizers; and
wherein a first of the at least two mutually exclusive fertilizers is packaged in the inner compartment, and a second of the at least two mutually exclusive fertilizers is packaged in the outer compartment.

13. The package according to claim 12, wherein both the top and the bottom of the internal bag and the external bag are congruent and coextensive one to another.

14. The package according to claim 12, wherein the bottom of the internal bag is attached to the bottom of the outer bag in at least two locations.

15. The package according to claim 12, wherein the internal bag is additionally attached to the outer bag along a portion of a height axis connecting the top side with the bottom side.

16. The package according to claim 12, wherein the internal bag comprises two inner pleats along its side edges, and the external bag comprises two inner pleats along its side edges.

17. A package for storage and delivery of fertilizer compositions, wherein said package comprises:
an internal bag, the inside of the internal bag defining an inner compartment for storage of a first fertilizer composition, the internal bag having an opening providing access to the inner compartment;
an external bag containing the internal bag, the external bag defining a single outer compartment for storage of a second fertilizer composition, the outer compartment being formed by a space between an inside surface of the external bag and an outside surface of the internal bag, the external bag having an opening;
wherein the opening of the internal bag is essentially aligned, coextensive and congruent with the opening of the external bag;
wherein a first gap is formed between a first side of the opening of the internal bag and a corresponding first side of the external bag, and a second gap is formed between a second side of the opening of the internal bag and a corresponding second side of the external bag, and the first and second gaps both provide access to the outer compartment; and
wherein the package comprises at least two mutually exclusive fertilizers, a first one of the mutually exclusive fertilizers being packaged in the inner compartment, and a second one of the mutually exclusive fertilizers being packaged in the outer compartment;
wherein the internal bag is attached to the external bag only at a top portion of a left edge of the package and at a top portion of a right edge of the package, and a bottom of the internal bag is attached to a bottom of the external bag in at least two locations.

18. The package according to claim 17,
wherein the package comprises a pair of two mutually exclusive fertilizers;
wherein a first of the pair of the two mutually exclusive fertilizers is packaged in the inner compartment, and a second of the pair of the two mutually exclusive fertilizers is packaged in the outer compartment,
wherein the pair of the two mutually exclusive fertilizers is selected from the group consisting of potassium chloride and urea; monoammonium phosphate and urea; a superphosphate and urea; an ammonium nitrate and urea; elemental sulfur and a nitrate; elemental sulfur and an ammonium compound; potassium pentahydrogen phosphate and a carbonate; acidulated rock phosphate magnesium nitrate and a carbonate; calcium nitrate and other generally inert fertilizers; and potassium pentahydrogen phosphate and other generally inert fertilizers.

19. The package according to claim 18, wherein said superphosphate is selected from monocalcium phosphate as single, double and triple superphosphate.

20. The package according to claim 18, wherein said ammonium nitrate is selected from the group consisting of ammonium nitrate, calcium ammonium nitrate, and ammonium sulfate nitrate.

21. The package according to claim 18, wherein said nitrate is selected from the group consisting of ammonium nitrate, calcium nitrate, magnesium nitrate, potassium nitrate, and sodium nitrate.

22. The package according to claim 18, wherein said carbonate is potassium carbonate.

23. The package according to claim 17, wherein the fertilizer is composed of the composition of formula NPK 18-12-12 and 10.5 CaO, or NPK 19-16-16 and 5 CaO, or NPK 18-12-12 and 10 CaO, or NPK 12-6-24 and 10 CaO, or NPK 11-6-17 and 15 CaO.

24. The package according to claim 17, wherein both a top and a bottom of the internal bag and a top and a bottom of the external bag are congruent and coextensive one to another.

25. The package according to claim 17, wherein the internal bag comprises two inner pleats along its side edges, and the external bag comprises two inner pleats along its side edges.

\* \* \* \* \*